United States Patent
Yamaguchi et al.

(10) Patent No.: US 10,026,196 B2
(45) Date of Patent: Jul. 17, 2018

(54) APPARATUSES AND METHODS FOR SELF-POSITION CALCULATION OF A VEHICLE USING A LIGHT PROJECTOR AND A CAMERA

(71) Applicant: Nissan Motor Co., Ltd., Yokohama-Shi, Kanagawa (JP)

(72) Inventors: Ichiro Yamaguchi, Kanagawa (JP); Hidekazu Nishiuchi, Kanagawa (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 93 days.

(21) Appl. No.: 15/118,240

(22) PCT Filed: Feb. 24, 2014

(86) PCT No.: PCT/JP2014/054310
§ 371 (c)(1),
(2) Date: Aug. 11, 2016

(87) PCT Pub. No.: WO2015/125296
PCT Pub. Date: Aug. 27, 2015

(65) Prior Publication Data
US 2017/0186186 A1    Jun. 29, 2017

(51) Int. Cl.
*G06K 9/00*    (2006.01)
*G06T 7/73*    (2017.01)
(Continued)

(52) U.S. Cl.
CPC ............ *G06T 7/74* (2017.01); *G05D 1/0251* (2013.01); *G06T 7/521* (2017.01); *G06T 2207/30252* (2013.01)

(58) Field of Classification Search
None
See application file for complete search history.

(56) References Cited

U.S. PATENT DOCUMENTS

| 5,155,775 A | 10/1992 | Brown |
| 2005/0163343 A1 | 7/2005 | Kakinami et al. |

(Continued)

FOREIGN PATENT DOCUMENTS

| DE | 69033898 T2 | 8/2002 |
| JP | H06325298 A | 11/1994 |

(Continued)

OTHER PUBLICATIONS

Yasushi Kanazawa, et al., "Detection of Feature Points for Computer Vision", IEICE Journal, Dec. 2004, pp. 1043-1048, vol. 87, No. 12.

(Continued)

*Primary Examiner* — Idowu O Osifade
(74) *Attorney, Agent, or Firm* — Young Basile Hanlon & MacFarlane, P.C.

(57) ABSTRACT

A self-position calculating apparatus includes: a light projector projecting a patterned light beam onto a road surface around a vehicle; and a camera capturing an image of the road surface including an area onto which the patterned light beam is projected. The apparatus calculates an orientation angle of the vehicle from a position of the patterned light beam, and calculate an amount of change in orientation based on temporal changes in multiple feature points on the road surface. The apparatus calculates current position and orientation angle by adding the amount of change to initial position and orientation angle. If a condition under which the multiple feature points are detected does not satisfy a first criterion, the apparatus sets the current position at that time and the orientation angle at the initial position and orientation, and starts adding the amount of change to the initial position and orientation angle.

9 Claims, 12 Drawing Sheets

(51) Int. Cl.
*G06T 7/521* (2017.01)
*G05D 1/02* (2006.01)

(56) References Cited

U.S. PATENT DOCUMENTS

| | | | |
|---|---|---|---|
| 2012/0022739 A1* | 1/2012 | Zeng | B60W 30/12 |
| | | | 701/536 |
| 2013/0182906 A1 | 7/2013 | Kojo et al. | |
| 2015/0161456 A1* | 6/2015 | Chevalley | G01B 11/00 |
| | | | 348/148 |

FOREIGN PATENT DOCUMENTS

| | | |
|---|---|---|
| JP | 2004198211 A | 7/2004 |
| JP | 2004198212 A | 7/2004 |
| JP | 2007256090 A | 10/2007 |
| JP | 2008175717 A | 7/2008 |
| JP | 2010101683 A | 5/2010 |
| JP | 2013147114 A | 8/2013 |
| JP | 2013187862 A | 9/2013 |
| WO | 2012172870 A1 | 12/2012 |
| WO | 2014020744 A1 | 2/2014 |

OTHER PUBLICATIONS

R. I. Hartley, "A linear method for reconstruction from lines and points," Proc. 5th International Conference on Computer Vision, Cambridge, Massachusetts, pp. 882-887 (1995).

D. G. Lowe, "Distinctive Image Features from Scale-Invariant Keypoints," Int. J. Comput. Vis., vol. 60, No. 2, pp. 91-110, Nov. 2004.

* cited by examiner

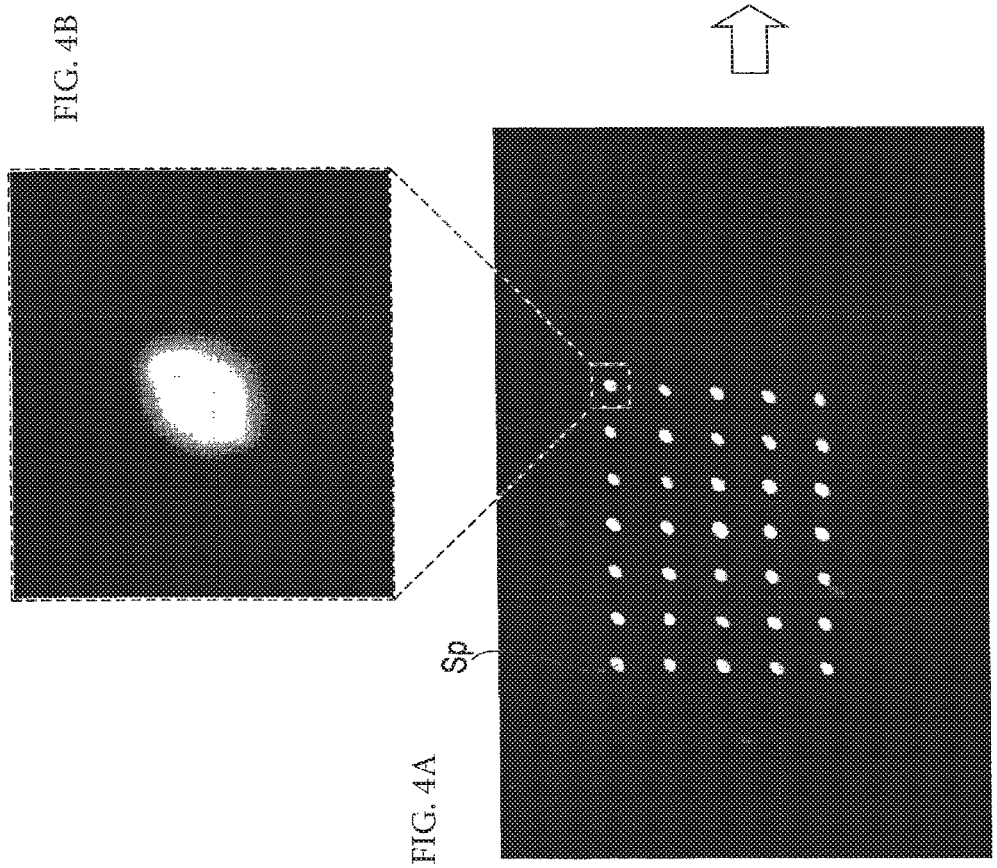

APPARATUSES AND METHODS FOR SELF-POSITION CALCULATION OF A VEHICLE USING A LIGHT PROJECTOR AND A CAMERA

TECHNICAL FIELD

The present invention relates to a self-position calculating apparatus and a self-position calculating method.

BACKGROUND

A technology has been known in which: cameras installed in a vehicle capture images of surroundings of the vehicle; and an amount of movement of the vehicle is obtained based on changes in the images (see Japanese Patent Application Publication No. 2008-175717). Japanese Patent Application Publication No. 2008-175717 aims at obtaining the amount of movement of the vehicle accurately even when the vehicle moves slightly at slow-speed. To this end, a feature point is detected from each image; the position of the feature point on the image is obtained; and thereby, the amount of movement of the vehicle is obtained from a direction and a distance of movement (amount of movement) of the feature point.

If, however, the feature point is detected under a bad condition, it is difficult to accurately obtain the amount of movement of the vehicle from the position of the feature point.

SUMMARY

The present invention has been made with the foregoing situation taken into consideration. An object of the present invention is to provide a self-position calculating apparatus and a self-position calculating method which are capable of accurately and stably estimating a current position of the vehicle regardless of the condition under which feature points are detected.

A self-position calculating apparatus according to an aspect of the present invention includes: a light projector configured to project a patterned light beam onto a road surface around a vehicle; and an image capturing unit configured to capture an image of the road surface around the vehicle including an area onto which the patterned light beam is projected. The self-position calculating apparatus calculates an orientation angle of the vehicle relative to the road surface from a position of the patterned light beam on the image obtained by the image capturing unit, and calculates an amount of change in the orientation of the vehicle based on temporal changes in multiple feature points on the road surface which are detected from the image. Furthermore, the self-position calculating apparatus calculates current position and orientation angle of the vehicle by adding the amount of change in the orientation to initial position and orientation angle of the vehicle. If a condition under which the multiple feature points are detected is too bad to satisfy a first criterion, the self-position calculating apparatus sets the initial position and orientation angle of the vehicle at the current position of the vehicle at that time, and the orientation angle of the vehicle calculated from the position of the patterned light beam at that time, respectively. Then, the self-position calculating apparatus starts to add the amount of change in the orientation.

BRIEF DESCRIPTION OF THE DRAWINGS

FIGS. 4(a) and 4(b) are diagrams each showing an image of the patterned light beam 32a which is obtained by applying a binarization process to an image obtained by the camera 12;

FIG. 4(a) is a diagram showing an image of the patterned light beam 32a as a whole;

FIG. 4(b) is a magnified diagram showing an image of one spotlight $S_p$;

FIG. 4(c) is a diagram showing a position $H_e$ of the center of gravity of each spotlight $S_p$ extracted by a patterned light beam extractor 21;

DETAILED DESCRIPTION OF THE EMBODIMENTS

Figure 1:
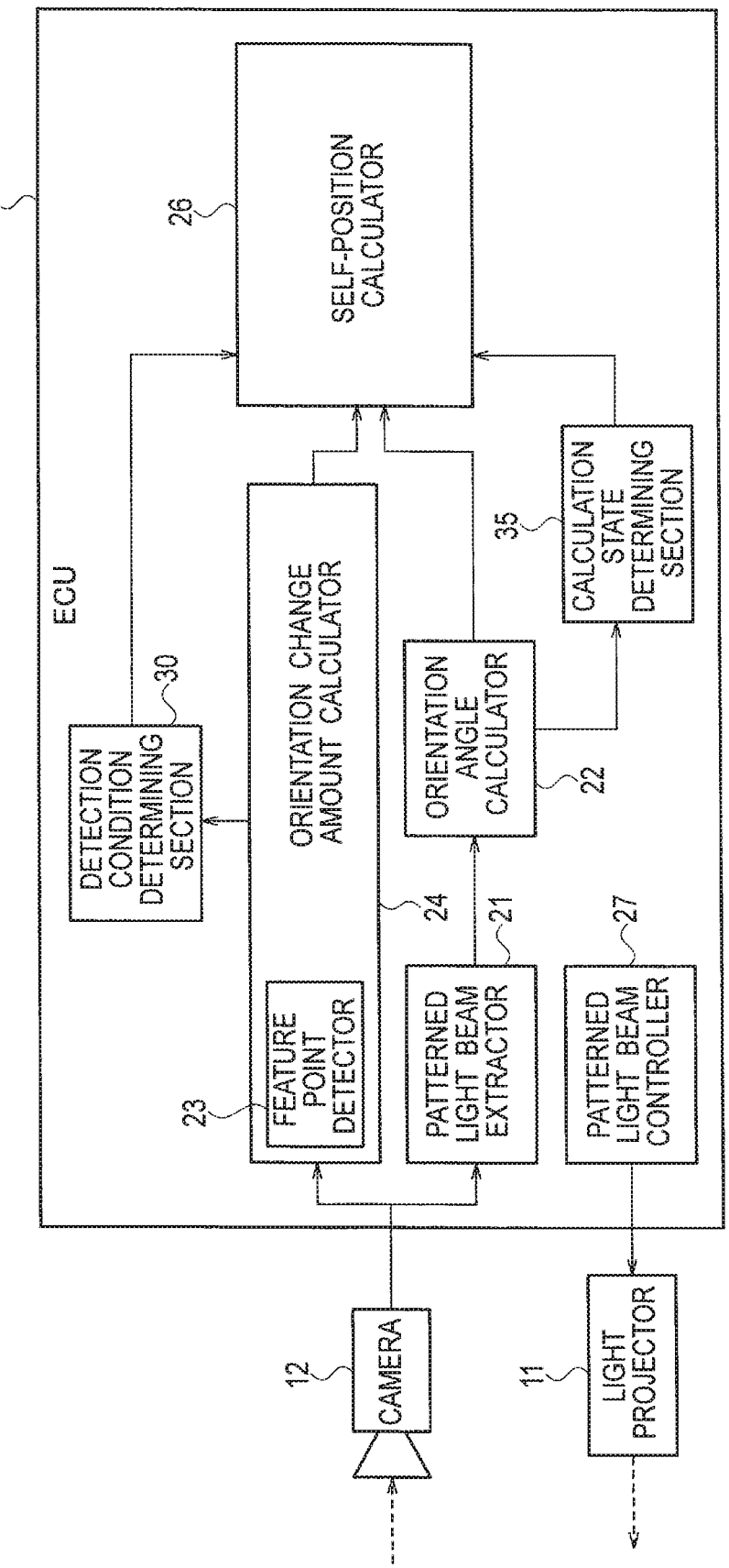
FIG. 1 is a block diagram showing an overall configuration of a self-position calculating apparatus of a first embodiment.

Referring to the drawings, descriptions will be provided for embodiments. The same components across the drawings will be denoted by the same reference signs. Descriptions for such components will be omitted.

First Embodiment

[Hardware Configuration]

To begin with, referring to FIG. 1, descriptions will be provided for a hardware configuration of a self-position calculating apparatus of a first embodiment. The self-position calculating apparatus includes a light projector 11, a camera 12 and an engine control unit (ECU) 13. The light projector 11 is installed in a vehicle, and projects a patterned light beam onto a road surface around the vehicle. The camera 12 is installed in the vehicle, and is an example of an image capturing unit configured to capture and thus obtain images of the road surface around the vehicle, inclusive of an area onto which the patterned light beam is projected. The ECU 13 is an example of a controller configured to control the light projector 11, and to perform a series of information process cycles for estimating an amount of movement of the vehicle from images obtained by the camera 12.

Figure 2:
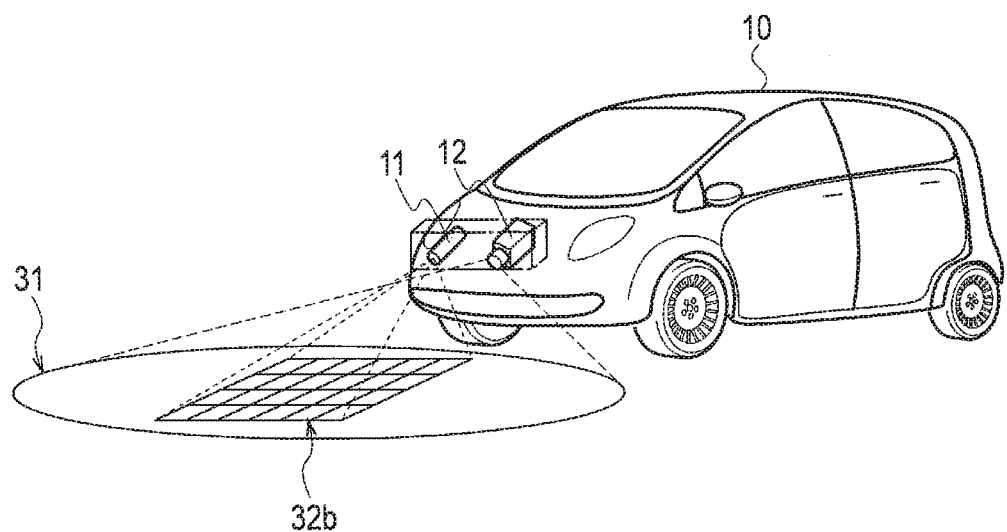
FIG. 2 is an external view showing an example of how a light projector 11 and a camera 12 are installed in a vehicle 10.

The camera 12 is a digital camera using a solid-state image sensor such as a CCD and a CMOS, and obtains processable digital images. What the camera 12 captures is the road surface around the vehicle. The road surface around the vehicle includes road surfaces in front of, in the back of, at sides of, and beneath the vehicle. As shown in FIG. 2, the camera 12 may be installed in a front section of the vehicle 10, more specifically above a front bumper, for example.

The height at and direction in which to set the camera 12 are adjusted in a way that enables the camera 12 to capture images of feature points (textures) on the road surface 31 in front of the vehicle 10 and the patterned light beam 32b projected from the light projector 11. The focus and diaphragm of the lens of the camera 12 are automatically adjusted as well. The camera 12 repeatedly captures images at predetermined time intervals, and thereby obtains a series of image (frame) groups. Image data obtained by the camera 12 is transferred to the ECU 13, and is stored in a memory included in the ECU 13.

As shown in FIG. 2, the light projector 11 projects the patterned light beam 32b having a predetermined shape, inclusive of a square or rectangular lattice shape, onto the road surface 31 within an image capturing range of the camera 12. The camera 12 captures images of the patterned light beam projected onto the road surface 31. The light projector 11 includes a laser pointer and a diffraction grating, for example. The diffraction grating diffracts the laser beam projected from the pointer. Thereby, as shown in FIGS. 2 to 4, the light projector 11 generates the patterned light beam (32b, 32a) which includes multiple spotlights $S_p$ arranged in a lattice or matrix pattern. In examples shown in FIGS. 3 and 4, the light projector 11 generates the patterned light beam 32a including 5×7 spotlights $S_p$.

Returning to FIG. 1, the ECU 13 includes a CPU, a memory, and a microcontroller including an input-output section. By executing pre-installed computer programs, the ECU 13 forms multiple information processors which are provided with the self-position calculating apparatus. For each image (frame), the ECU 13 repeatedly performs the series of information process cycles for calculating the self-position of the vehicle from images obtained by the camera 12. The ECU 13 may be also used as an ECU for controlling other systems relating to the vehicle 10.

The multiple information processors include a patterned light beam extractor 21, an orientation angle calculator 22, an orientation change amount calculator 24, a self-position calculator 26, a patterned light beam controller 27, a detection condition determining section 30, and a calculation state determining section 35. The orientation change amount calculator 24 includes a feature point detector 23.

Figure 3A:
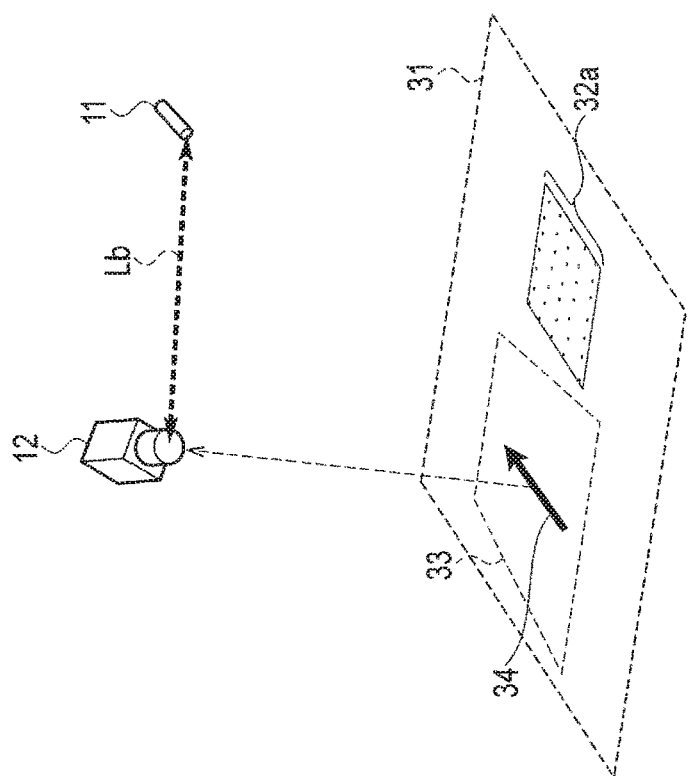
FIG. 3(a) is a diagram showing how positions of places on a road surface 31 onto which spotlights are respectively projected are calculated from a base length Lb between the light projector 11 and the camera 12, as well as coordinates $(U_j, V_j)$ of each spotlight.

The patterned light beam extractor 21 reads an image obtained by the camera 12 from the memory, and extracts the position of the patterned light beam from this image. For example, as shown in FIG. 3(a), the light projector 11 projects the patterned light beam 32a, which includes the multiple spotlights arranged in a matrix pattern, onto the road surface 31, while the camera 12 detects the patterned light beam 32a reflected off the road surface 31. The patterned light beam extractor 21 applies a binarization process to the image obtained by the camera 12, and thereby extracts only an image of the spotlights $S_p$, as shown in FIGS. 4(a) and 4(b). Thereafter, as shown in FIG. 4(c), the patterned light beam extractor 21 extracts the position of the patterned light beam 32a by calculating the center-of-gravity position $H_e$ of each spotlight $S_p$, that is to say, the coordinates $(U_j, V_j)$ of each spotlight $S_p$ on the image. The coordinates are expressed using the number assigned to a corresponding pixel in the image sensor of the camera 12. In a case where the patterned light beam includes 5×7 spotlights $S_p$, "j" is an integer not less than 1 but not greater than 35. The memory stores the coordinates $(U_j, V_j)$ of the spotlight $S_p$ on the image as data on the position of the patterned light beam 32a.

The orientation angle calculator 22 reads the data on the position of the patterned light beam 32a from the memory, and calculates the distance and orientation angle of the vehicle 10 relative to the road surface 31 from the position of the patterned light beam 32a on the image obtained by the camera 12. For example, as shown in FIG. 3(a), using the trigonometrical measurement principle, the orientation angle calculator 22 calculates the position of each spotlighted area on the road surface 31, as the position of the spotlighted area relative to the camera 12, from a base length Lb between the light projector 11 and the camera 12, as well as the coordinates $(U_j, V_j)$ of each spotlight on the image. Thereafter, the orientation angle calculator 22 calculates a plane equation of the road surface 31 onto which the patterned light beam 32a is projected, that is to say, the distance and orientation angle (normal vector) of the camera 12 relative to the road surface 31, from the position of each spotlight relative to the camera 12. It should be noted that in the embodiment, the distance and orientation angle of the camera 12 relative to the road surface 31 are calculated as an example of the distance and orientation angle of the vehicle 10 relative to the road surface 31 since the position of installation of the camera 12 in the vehicle 10 and the angle for the camera 12 to capture images are already known. Hereinafter, the distance and orientation angle of the camera 12 relative to the road surface 31 will be referred to as "distance and orientation angle." The distance and orientation angle calculated by the orientation angle calculator 22 are stored into the memory.

To put it specifically, since the camera 12 and the light projector 11 are fixed to the vehicle 10, the direction in which to project the patterned light beam 32a and the distance (the base length Lb) between the camera 12 and the light projector 11 are already known. For this reason, using the trigonometrical measurement principle, the orientation angle calculator 22 is capable of obtaining the position of each spotlighted area on the road surface 31, as the position $(X_j, Y_j, Z_j)$ of each spotlight relative to the camera 12, from the coordinates $(U_j, V_j)$ of each spotlight on the image.

It should be noted that, in many cases, the position $(X_j, Y_j, Z_j)$ of each spotlight relative to the camera 12 is not present on the same plane. This is because the relative position of each spotlight changes according to the unevenness of the asphalt of the road surface 31. For this reason, the method of least squares may be used to obtain a plane equation which makes the sum of squares of distance difference of each spotlight becomes least.

The feature point detector 23 reads the image obtained by the camera 12 from the memory, and detects feature points on the road surface 31 from the image read from the memory. In order to detect the feature points on the road surface 31, the feature point detector 23 may use a method described in "D. G. Lowe, "Distinctive Image Features from Scale-Invariant Keypoints," Int. J. Comput. Vis., vol. 60, no. 2, pp. 91-110, November 200." Otherwise, the feature point detector 23 may use a method described in "Kanazawa Yasushi, Kanatani Kenichi, "Detection of Feature Points for Computer Vision," IEICE Journal, vol. 87, no. 12, pp. 1043-1048, December 2004."

Figure 6A:
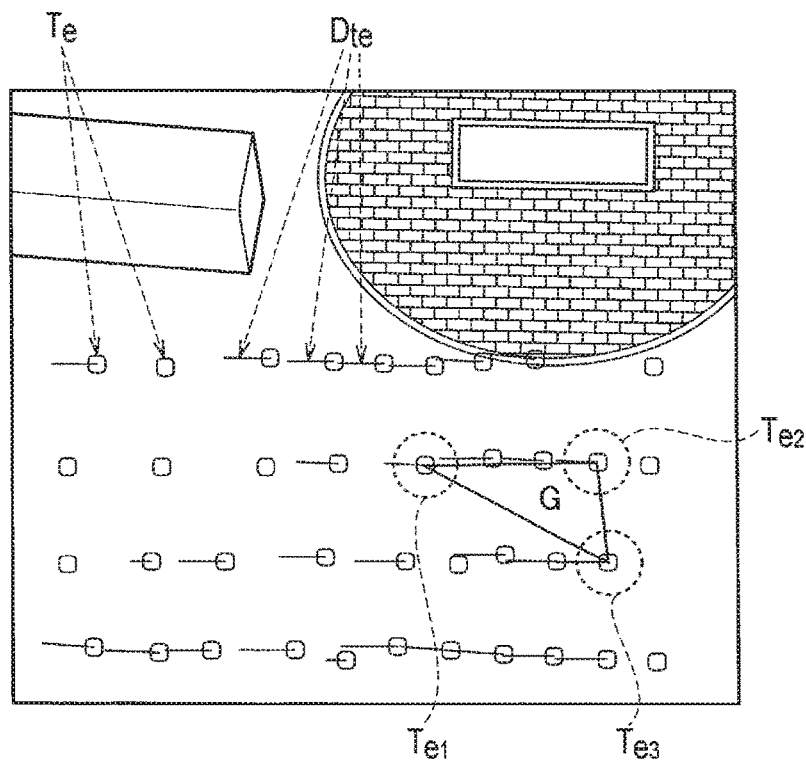
FIG. 6(a) shows an example of a first frame (image) 38 obtained at time t.
Figure 6B:
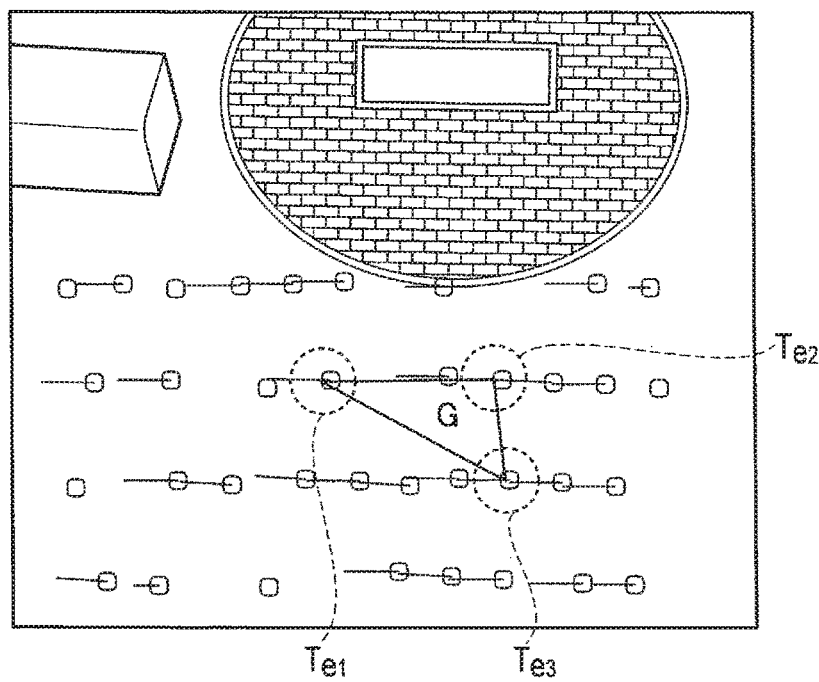
FIG. 6(b) shows a second frame 38' obtained at time (t+Δt) until which time Δt elapses from time t.

To put it specifically, for example, the feature point detector 23 uses the Harris operator or the SUSAN operator as that points, such as apexes of an object, the luminance values of which are largely different from those of the vicinities of the points are detected as the feature points. Instead, however, the feature point detector 23 may use a SIFT (Scale-Invariant Feature Transform) feature amount so that points around which the luminance values change with certain regularity are detected as the feature points. After detecting the feature points, the feature point detector 23 counts the total number N of feature points detected from one image, and assigns identification numbers (i (1≤i≤N)) to the respective feature points. The position ($U_i$, $V_i$) of each feature point on the image are stored in the memory inside the ECU 13. FIGS. 6(a) and 6(b) each shows examples of the feature points $T_e$ which are detected from the image obtained by the camera 12. The positions ($U_i$, $V_i$) of the respective feature points on the image are stored in the memory.

It should be noted that the embodiment treats particles of asphalt mixture with a particle size of not less than 1 cm but not greater than 2 cm as the feature points on the road surface 31. The camera 12 employs the VGA resolution mode (approximate 300 thousand pixels) in order to detect the feature points. In addition, the distance from the camera 12 to the road surface 31 is approximately 70 cm. Moreover, the direction in which the camera 12 captures images is tilted at approximately 45 degrees to the road surface 31 from the horizontal plane. What is more, the luminance value of each image obtained by the camera 12 and thereafter sent to the ECU 13 is within a range of 0 to 255 (0: darkest, 255: brightest).

The orientation change amount calculator 24 reads, from the memory, the positions ($U_i$, $V_i$) of the respective multiple feature points on an image included in a previous frame which is among the flames captured during each certain information process cycle. Furthermore, the orientation change amount calculator 24 reads, from the memory, the positions ($U_i$, $V_i$) of the respective multiple feature points on an image included in a current frame. Thereafter, based on changes in the positions of the multiple feature points on the images, the orientation change amount calculator 24 obtains an amount of change in the orientation of the vehicle. In this respect, the "amount of change in the orientation of the vehicle" includes both amounts of changes in "the distance and orientation angle" of the vehicle relative to the road surface 31 and an "amount of movement of the vehicle (the camera 12)" on the road surface. Descriptions will be hereinbelow provided for how to calculate the amounts of changes in the distance and orientation angle and the amount of movement of the vehicle.

Figure 5:
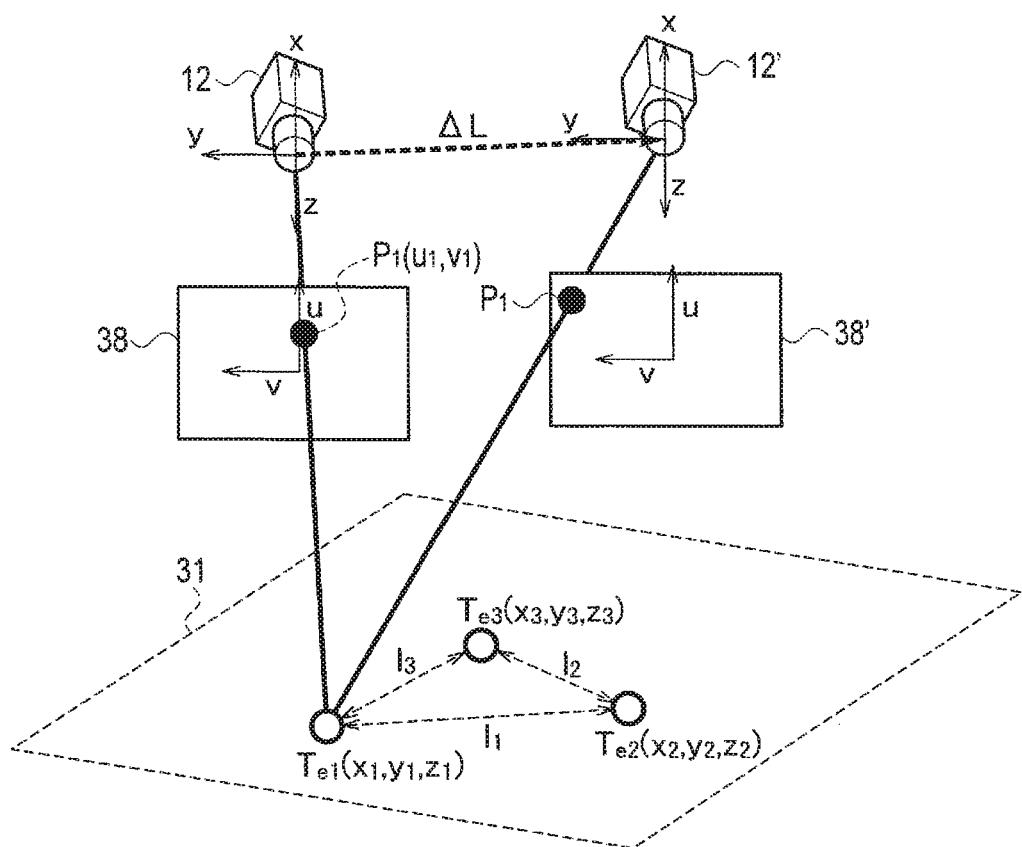
FIG. 5 is a schematic diagram for explaining how to calculate amounts of changes in distance and orientation angle.

FIG. 6(a) shows an example of a first frame (image) 38 obtained at time t. Let us assume a case where as shown in FIG. 5 or 6(a), a relative position ($X_i$, $Y_i$, $Z_i$) of each of three feature points $T_{e1}$, $T_{e2}$, $T_{e3}$ are calculated on the first frame 38, for example. In this case, a plane G identified by the feature points $T_{e1}$, $T_{e2}$, $T_{e3}$ can be regarded as the road surface. Accordingly, the orientation change amount calculator 24 is capable of obtaining the distance and orientation angle (normal vector) of the camera 12 relative to the road surface (the plane G), from the relative position ($X_i$, $Y_i$, $Z_i$). Furthermore, from an already-known camera model, the orientation change amount calculator 24 is capable of obtaining a distance $l_1$ between the feature points $T_{e1}$, $T_{e2}$, a distance $l_2$ between the feature points $T_{e2}$, $T_{e3}$ and a distance $l_3$ between the feature points $T_{e3}$, $T_{e1}$, as well as an angle between a straight line joining the feature points $T_{e1}$, $T_{e2}$ and a straight line joining the feature points $T_{e2}$, $T_{e3}$, an angle between the straight line joining the feature points $T_{e2}$, $T_{e3}$ and a straight line joining the feature points $T_{e3}$, $T_{e1}$, and an angle between the straight line joining the feature points $T_{e3}$, $T_{e1}$ and the straight line joining the feature points $T_{e1}$, $T_{e2}$. The camera 12 in FIG. 5 shows where the camera is located when camera is for the first frame.

It should be noted that the three-dimensional coordinates ($X_i$, $Y_i$, $Z_i$) of the relative position relative to the camera 12 are set in a way that: the Z-axis coincides with the direction in which the camera 12 captures the image; and the X and Y axes orthogonal to each other in a plane including the camera 12 are lines normal to the direction in which the camera 12 captures the image. Meanwhile, the coordinates on the image 38 are set such that: the V-axis coincides with the horizontal direction; and the U-axis coincides with the vertical direction.

FIG. 6(b) shows a second frame obtained at time (t+Δt) where the time length Δt passed from time t. A camera 12' in FIG. 5 shows where the camera is located when camera captures the second frame 38'. As shown in FIG. 5 or 6(b), the camera 12' captures an image including the feature points $T_{e1}$, $T_{e2}$, $T_{e3}$ as the second frame 38', and the feature point detector 23 detects the feature points $T_{e1}$, $T_{e2}$, $T_{e3}$ from the image. In this case, the orientation change amount calculator 24 is capable of calculating not only an amount ΔL of movement of the camera 12 in the interval of time Δt but also an amounts of changes in the distance and the orientation angle of the camera 12 in the interval of time Δt from: the relative position ($X_i$, $Y_i$, $Z_i$) of each of the feature points $T_{e1}$, $T_{e2}$, $T_{e3}$ at time t; a position $P_1(U_i, V_i)$ of each feature point on the second frame 38'; and the camera model of the camera 12. For example, the orientation change amount calculator 24 is capable of calculating the amount (ΔL) of movement of the camera 12 (the vehicle) and the amounts of changes in the distance and orientation angle of the camera 12 (the vehicle) by solving the following system of simultaneous equations (1) to (4). Incidentally, the equation (1) is based on an ideal pinhole camera free from strain and optical axial misalignment which is modeled after the camera 12, where λi and f denote a constant and a focal length. The parameters of the camera model may be calibrated in advance.

[Equation 1]

$$\lambda_i \begin{bmatrix} u_i \\ v_i \\ 1 \end{bmatrix} = \begin{bmatrix} f & 0 & 0 \\ 0 & f & 0 \\ 0 & 0 & 1 \end{bmatrix} \begin{bmatrix} x_i \\ y_i \\ z_i \end{bmatrix} \quad (1)$$

[Equation 2]

$$(x_1 - x_2)^2 + (y_1 - y_2)^2 + (z_1 - z_2)^2 = l_1^2 \quad (2)$$

[Equation 3]

$$(x_3 - x_2)^2 + (y_3 - y_2)^2 + (z_3 - z_2)^2 = l_2^2 \quad (3)$$

-continued

[Equation 4]

$$(x_1 - x_3)^2 + (y_1 - y_3)^2 + (z_1 - z_3)^2 = l_3^2 \qquad (4)$$

Figure 3B:
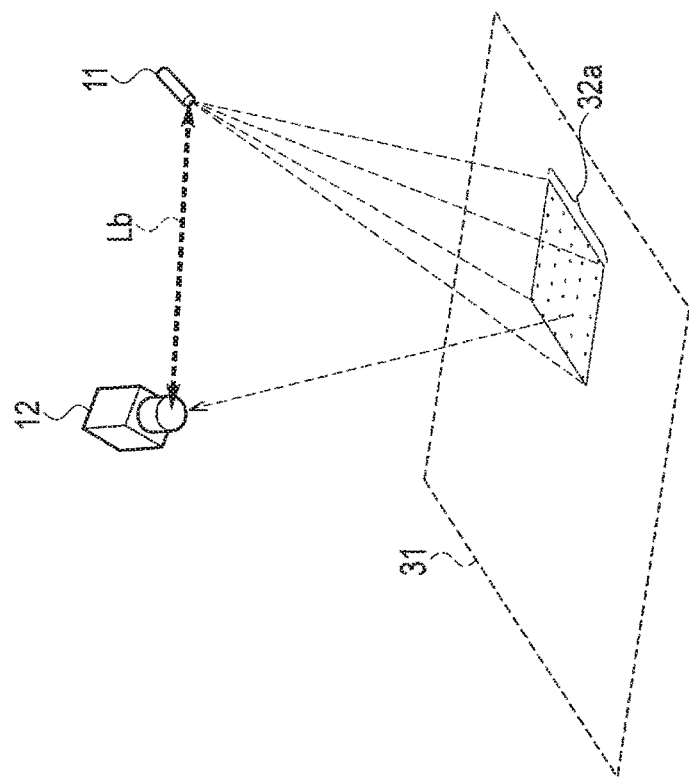
FIG. 3(b) is a schematic diagram showing how a direction 34 of movement of the camera 12 is obtained from temporal changes in feature points detected from another area 33 which is different from an area onto which the patterned light beam 32a is projected.

FIG. 3(b) schematically shows how a direction 34 of movement of the camera 12 is obtained from temporal changes in feature points detected from another area 33 within the image capturing range of the camera 12, which is different from the area onto which the patterned light beam 32a is projected. Furthermore, FIGS. 6(a) and 6(b) each show an example of an image in which each vector $D_{te}$ represents a direction and an amount of change in the position of its corresponding feature point $T_e$. The orientation change amount calculator 24 is capable of calculating not only the amount (ΔL) of movement of the camera 12 for the time length Δt, but also the amounts of changes in the distance and orientation angle for the time length Δt, simultaneously. For this reason, with the amounts of changes in the distance and orientation angle taken into consideration, the orientation change amount calculator 24 is capable of accurately calculating the amount (ΔL) of movement in six degrees of freedom. In other words, an error in estimating the amount (ΔL) of movement can be minimized even when the distance and orientation angle are changed by the roll or pitch due to the turn, acceleration or deceleration of the vehicle 10.

It should be noted that instead of using all the feature points whose relative positions are calculated, the orientation change amount calculator 24 may select optimum feature points based on positional relationships among the feature points. An example of a selection method usable for this purpose is the epipolar geometry (the epipolar line geometry described in R. I. Hartley, "A linear method for reconstruction from lines and points," Proc. 5th International Conference on Computer Vision, Cambridge, Mass., pp. 882-887 (1995)).

The associating of the feature points in the current frame with the feature points in the previous frame may be achieved, for example, by: storing an image of a small area around each detected feature point into the memory; and for each feature point, making a determination from a similarity in luminance information and a similarity in color information. To put it specifically, the ECU 13 stores a 5(horizontal)×5(vertical)-pixel image around each detected feature point into the memory. If for example, the difference in the luminance information among 20 or more pixels is equal to or less than 1%, the orientation change amount calculator 24 determines that the feature point in question is associated between the current and previous frames.

If like in this case, the feature points $T_{e1}$, $T_{e2}$, $T_{e3}$ whose relative positions $(X_i, Y_i, Z_i)$ are calculated are detected from the frame image 38' obtained at the ensuing timing as well, the orientation change amount calculator 24 is capable of calculating the "amount of change in the orientation of the vehicle" from the temporal changes in the multiple feature points on the road surface.

The self-position calculator 26 calculates the distance and orientation angle from the "amounts of changes in the distance and orientation angle" calculated by the orientation change amount calculator 24. In addition, the self-position calculator 26 calculates the current position of the vehicle from the "amount of movement of the vehicle" calculated by the orientation change amount calculator 24.

To put it specifically, in a case where the distance and orientation angle calculated by the orientation angle calculator 22 (see FIG. 1) are set as the starting points, the self-position calculator 26 updates the distance and orientation angle with the most recent numerical values by sequentially adding (performing an integration operation on) the amounts of changes in the distance and orientation angle calculated for each frame by the orientation change amount calculator 24 to the starting points (the distance and orientation angle). In addition, the self-position calculator 26 calculates the current position of the vehicle by: setting the starting point (the initial position of the vehicle) at the position of the vehicle obtained when the orientation angle calculator 22 calculates the distance and orientation angle; and sequentially adding (performing an integration operation on) the amount of movement of the vehicle to the thus-set initial position thereof. For example, if the starting point (the initial position of the vehicle) is set to be matched to the position of the vehicle on a map, the self-position calculator 26 is capable of sequentially calculating the current position of the vehicle on the map.

To put it specifically, if three or more feature points each corresponding between the previous and current frames can be detected continuously from the two frames, the continuation of the process (integration operation) of adding the amounts of changes in the distance and orientation angle makes it possible to continuously update the distance and orientation angle without using the patterned light beam 32a. Nevertheless, the distance and orientation angle calculated using the patterned light beam 32a, or a predetermined initial distance and orientation angle, may be used for the first information process cycle. In other words, the distance and orientation angle which are starting points of the integration operation may be calculated using the patterned light beam 32a, or may be set at predetermined initial values. It is desirable that the predetermined initial distance and the predetermined initial orientation angle are a distance and an orientation angle determined with at least the occupants and payload of the vehicle 10 taken into consideration. For example, the distance and orientation angle calculated using the patterned light beam 32a which is projected while the ignition switch of the vehicle 10 is on and when the shift position is moved from the parking position to another position may be used as the predetermined initial distance and the predetermined initial orientation angle. Thereby, it is possible to obtain the distance and orientation angle which is not affected by the roll or pitch of the vehicle 10 due to a turn, acceleration or deceleration of the vehicle 10.

The embodiment is configured such that: the amounts of changes in the distance and orientation angle are repeatedly calculated, and are each time added thereto; and thereby, the amounts of changes in the distance and orientation angle are updated with the most recent numerical values. Instead, however, the embodiment may be configured such that: only the amount of change in the orientation angle of the camera 12 relative to the road surface 31 is repeatedly calculated, and are each time updated. In this case, it may be supposed that the distance between the road surface 31 and the camera 12 remains constant. This makes it possible to reduce the operation load on the ECU 13 while minimizing the error in estimating the amount (ΔL) of movement with the amount of change in the orientation angle taken into consideration, and to increase the operation speed of the ECU 13.

The detection condition determining section 30 determines whether or not a condition under which the feature point detector 23 detects the feature points $T_e$ is too bad to satisfy a first criterion. For example, if like a concrete pavement inside a tunnel, the road surface is less patterned and uneven with particles of asphalt mixture, the feature points detectable from an image of the road surface decreases in number. The decreased number of detectable feature points makes it difficult to continuously detect the feature points which are associated between the previous and current frames, and lowers the accuracy with which the distance and orientation angle are updated.

Figure 7:
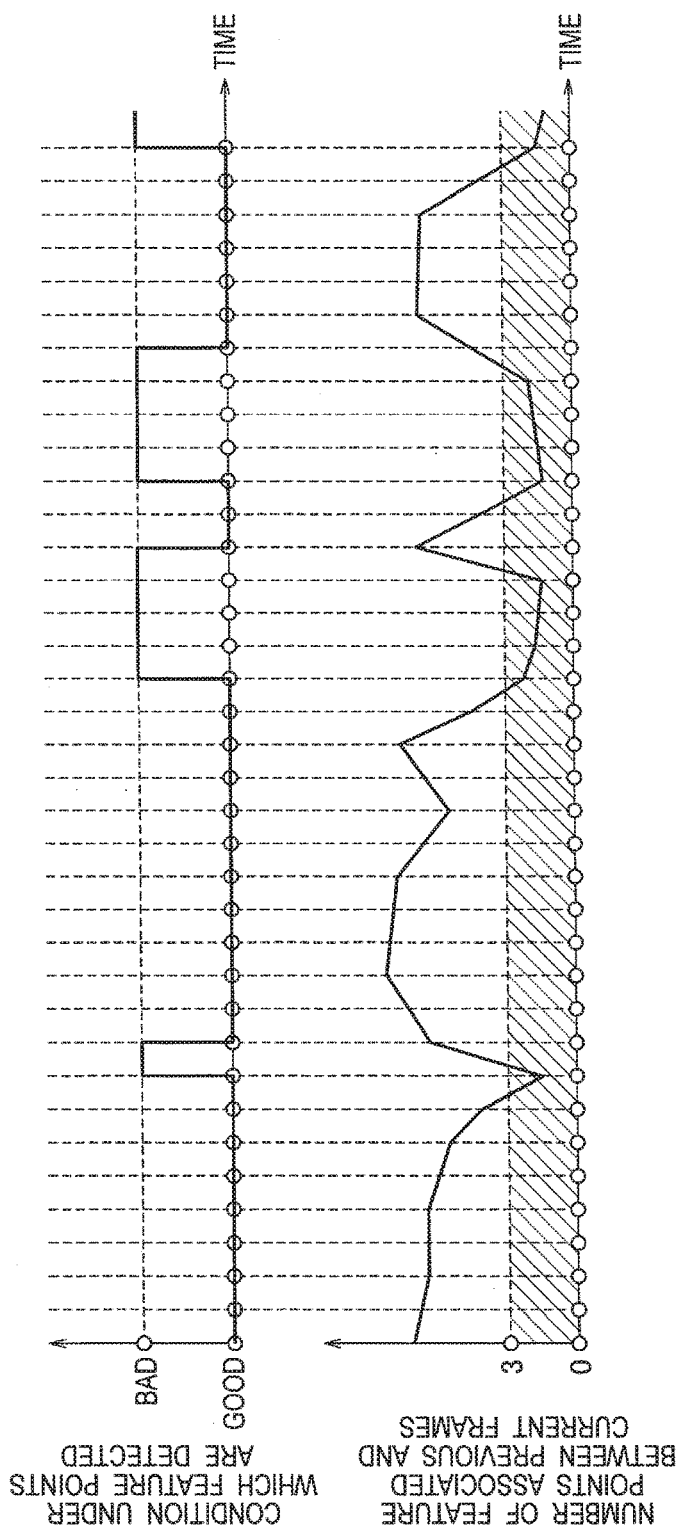
FIG. 7 is a graph showing a result of determining under which condition feature points $T_e$ are detected while the feature points $T_e$ correspond to the number of feature points associated between previous and current frames.

As a measure against this problem, the detection condition determining section 30 determines that the condition for detecting the feature points is too bad to satisfy the first criterion, if for example, the number of feature points, whose positions relative to the camera 12 are calculated and can be detected from an image obtained in the subsequent information process cycle, is equal to or less than a predetermined threshold value (three, for example). In other words, as shown in FIG. 7, if four or more feature points associated between the previous and current frames cannot be detected, the detection condition determining section 30 determines that the condition under which the feature points $T_e$ are detected is too bad to satisfy the first criterion. Incidentally, as shown in FIG. 6, at least three feature points associated between the previous and current frames are needed to obtain the amounts of changes in the distance and orientation angle. This is because three feature points are needed to define the plane G. Since more feature points are needed to increase the estimation accuracy, it is desirable that the predetermined threshold value be at four, five or more.

If the detection condition determining section 30 determines that the condition under which the feature points are detected satisfies the first criterion, the self-position calculator 26 retains the starting points of the integration operations. On the other hand, if the detection condition determining section 30 determines that the condition under which the feature points are detected is too bad to satisfy the first criterion, the self-position calculator 26 resets the starting points of the integration operations (the orientation angle and the initial position of the vehicle) at the distance and orientation angle calculated by the orientation angle calculator 22 (see FIG. 1), and the position of the vehicle obtained at the time of the calculation, in the same information process cycle. Thereafter, the self-position calculator 26 starts to add the amount of change in the orientation of the vehicle to the thus-reset starting points.

It should be noted that in the first embodiment, based on the number of feature points associated between the previous and current frames, the detection condition determining section 30 determines under what condition the feature points are detected. Instead, however, the detection condition determining section 30 may be configured such that, based on the total number N of feature points detected from one image, the detection condition determining section 30 determines under what condition the feature points are detected. To put it specifically, the configuration may be such that if the total number N of feature points detected from one image is equal to or less than a predetermined threshold value (9, for example), the detection condition determining section 30 determines that the condition under which the feature points are detected is too bad to satisfy the first criterion. A numerical value (9) three times the predetermined threshold value (3) may be set as such a threshold value because there is likelihood that some of detected feature points are not associated between the previous and current frames.

The calculation state determining section 35 determines whether or not a state of calculation of the distance and orientation angle by the orientation angle calculator 22 is too bad to satisfy a second criterion. For example, in a case where the patterned light beam is projected onto a bump on the road surface 31, the accuracy of the calculation of the distance and orientation angle decreases significantly because the bump on the road surface 31 is larger than dents and projections of the asphalt pavement. If the condition under which the feature points are detected is worse than the first criterion, and concurrently if the state of the calculation of the distance and orientation angle is too bad to satisfy the second criterion, there would otherwise be no means for accurately detecting the distance and orientation angle, as well as the amounts of changes in the distance and orientation angle.

With this taken into consideration, the calculation state determining section 35 determines that the state of the calculation of the distance and orientation angle by the orientation angle calculator 22 is too bad to satisfy the second criterion, if standard deviations of the distance and orientation angle calculated by the orientation angle calculator 22 are greater than predetermined threshold values. Furthermore, if the number of spotlights detected out of the 35 spotlights is less than three, the calculation state determining section 35 determines that the state of the calculation of the distance and orientation angle by the orientation angle calculator 22 is too bad to satisfy the second criterion, since theoretically, the plane equation of the road surface 31 cannot be obtained. In a case where the plane equation is obtained using the method of least square, if an absolute value of a maximum value among the differences between the spotlights and the plane obtained by the plane equation is equal to or greater than a certain threshold value (0.05 m, for example), the calculation state determining section 35 may determine that the state of the calculation of the distance and orientation angle by the orientation angle calculator 22 is too bad to satisfy the second criterion.

If the detection condition determining section 30 determines that the condition under which the feature points are detected is too bad to satisfy the first criterion, and concurrently if the calculation state determining section 35 determines that the state of the calculation of the distance and orientation angle by the orientation angle calculator 22 is too bad to satisfy the second criterion, the self-position calculator 26 uses the distance and orientation angle obtained in the previous information process cycle, as well as the current position of the vehicle, as the starting points of the integration operations. This makes it possible to minimize an error in calculating the amount of movement of the vehicle.

The patterned light beam controller 27 controls how the light projector 11 projects the patterned light beam 32a. For example, the patterned light beam controller 27 starts to project the patterned light beam 32a at the same time as the self-position calculating apparatus becomes activated after the ignition switch of the vehicle 10 is turned on. Thereafter, the patterned light beam controller 27 continues projecting the patterned light beam 32a until the self-position calculating apparatus stops its operation. Instead, the self-position calculating apparatus may be configured to alternately project and stop projecting the light at predetermined time intervals. Otherwise, the self-position calculating apparatus may be configured to temporarily project the patterned light beam 32a only in a case where the detection condition determining section 30 determines that the condition under which the feature points $T_e$ are detected is too bad to satisfy the first criterion.

(Information Process Cycle)

Next, as an example of a self-position calculating method of estimating the amount of movement of the vehicle 10 from the image 38 obtained by the camera 12, the information process cycle to be repeatedly performed by the ECU 13 will be described referring to FIGS. 8 and 9. The information process cycle shown in a flowchart of FIG. 8 is started at the same time as the self-position calculating apparatus becomes activated after the ignition switch of the vehicle 10 is turned on, and is repeatedly performed until the self-position calculating apparatus stops its operation.

Figure 8:
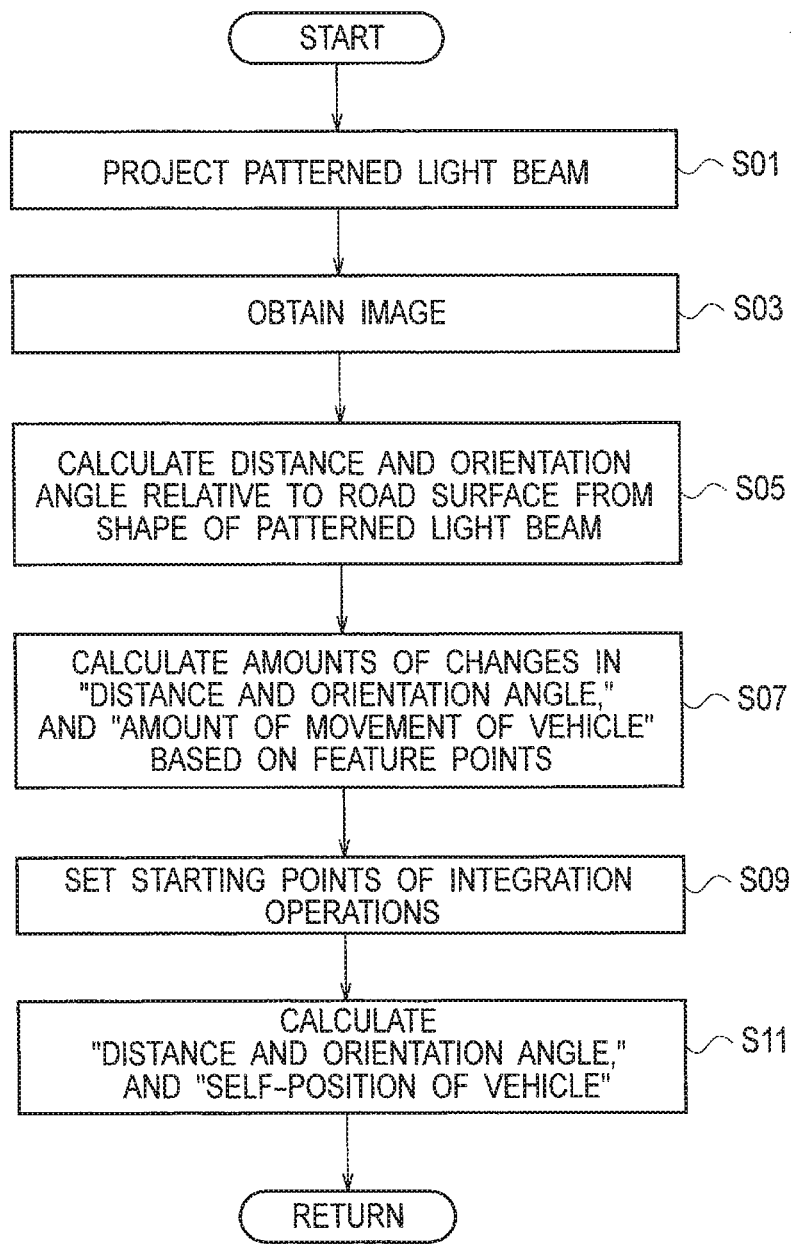
FIG. 8 is a flowchart showing an example of a self-position calculating method using the self-position calculating apparatus shown in FIG. 1.

In step S01 in FIG. 8, the patterned light beam controller 27 projects the patterned light beam 32$a$ on the road surface 31 around the vehicle by controlling the light projector 11. An example where the patterned light beam 32$a$ continues being projected will be described using a flowchart in FIG. 8.

Proceeding to step S03, the ECU 13 controls the camera 12 to obtain the image 38 by making the camera 12 shoot the road surface 31 around the vehicle, inclusive of an area onto which the patterned light beam 32$a$ is projected. The ECU 13 stores the data on the image obtained by the camera 12 into the memory.

It should be noted that the ECU 13 is capable of automatically controlling the diaphragm of the camera 12. The ECU 13 may be configured to perform a feedback control of the diaphragm of the camera 12 in a way that makes a value of brightness of the next image becomes equal to a median value between the maximum and minimum values in accordance with of an average of the brightness of the image 38 obtained in the previous information process cycle. Otherwise, since the value of the brightness of the area onto which the patterned light beam 32$a$ is projected, the ECU 13 may obtain an average value of the brightness of the previously-obtained image 38 from an area outside a part from which the patterned light beam 32$a$ is extracted.

The flow proceeds to step S05, where the patterned light beam extractor 21, first of all, reads the image 38 obtained by the camera 12 from the memory, and extracts the position of the patterned light beam 32$a$ from the image 38, as shown in FIG. 4(*c*). The patterned light beam extractor 21 stores into the memory the positions $(U_j, V_j)$ of the respective spotlights $S_p$ on the image which are calculated as data on the position of the patterned light beam 32$a$.

In step S05, the orientation angle calculator 22 reads the data on the position of the patterned light beam 32$a$ from the memory, calculates the distance and orientation angle from the position of the patterned light beam 32$a$, and stores the calculation results into the memory.

Proceeding to step S07, the ECU 13 detects the feature points from the image 38, extracts the feature points each corresponding between the previous and current information process cycles from the detected feature points, and calculates the amounts of changes in the distance and orientation angle, and the amount of movement of the vehicle from the positions $(U_j, V_j)$ of the respective extracted feature points on the image.

To put it specifically, to begin with, the feature point detector 23 reads the image 38 obtained by the camera 12 from the memory, detects the feature points on the road surface 31 from the image 38, and stores the positions $(U_j, V_j)$ of the respective feature points on the image into the memory. The orientation change amount calculator 24 reads the positions $(U_j, V_j)$ of the respective feature points on the image from the memory, and calculates the positions $(X_i, Y_i, Z_i)$ of the respective feature points relative to the camera 12 from the distance and orientation angle, as well as the positions $(U_j, V_j)$ of the respective feature points on the image. Incidentally, the orientation change amount calculator 24 uses the starting points (the distance and orientation angle) which are set in step S09 in the previous information process cycle. Thereafter, the orientation change amount calculator 24 stores the positions $(X_i, Y_i, Z_i)$ of the respective feature points relative to the camera 12 into the memory.

Then, the orientation change amount calculator 24 reads the positions $(U_j, V_j)$ of the respective feature points on the image, and the relative positions $(X_i, Y_i, Z_i)$ of the respective feature points calculated in step S07 in the previous information process cycle from the memory. The orientation change amount calculator 24 calculates the amounts of changes in the distance and orientation angle using: the relative positions $(X_i, Y_i, Z_i)$ of the respective feature points each corresponding between the previous and current information process cycles; and the positions $(U_j, V_j)$ of the respective thus-corresponding feature points on the image. Furthermore, the orientation change amount calculator 24 calculates the amount of movement of the vehicle from the previous relative positions $(X_i, Y_i, Z_i)$ of the respective feature points in the previous information process cycle and the current relative positions $(X_i, Y_i, Z_i)$ of the respective feature points in the current information process cycle. The "amounts of changes in the distance and orientation angle" and the "amount of movement of the vehicle" which are calculated in step S07 are used for the process in step S11.

Proceeding to step S09, the ECU 13 sets the starting points of the integration operations depending on: the condition under which the multiple feature points are detected; and the state of the calculation of the distance and orientation angle from the patterned light beam. Details will be later described referring to FIG. 9.

Proceeding to step S11, the self-position calculator 26 calculates the current position of the vehicle from: the starting points of the integration operations set in the process in step S09; and the amount of movement of the vehicle calculated in step S07.

Thus, the self-position calculating apparatus of the embodiment is capable of calculating the current position of the vehicle 10 by repeatedly performing the foregoing series of information process cycles to integrate the amount of movement of the vehicle 10.

Figure 9:
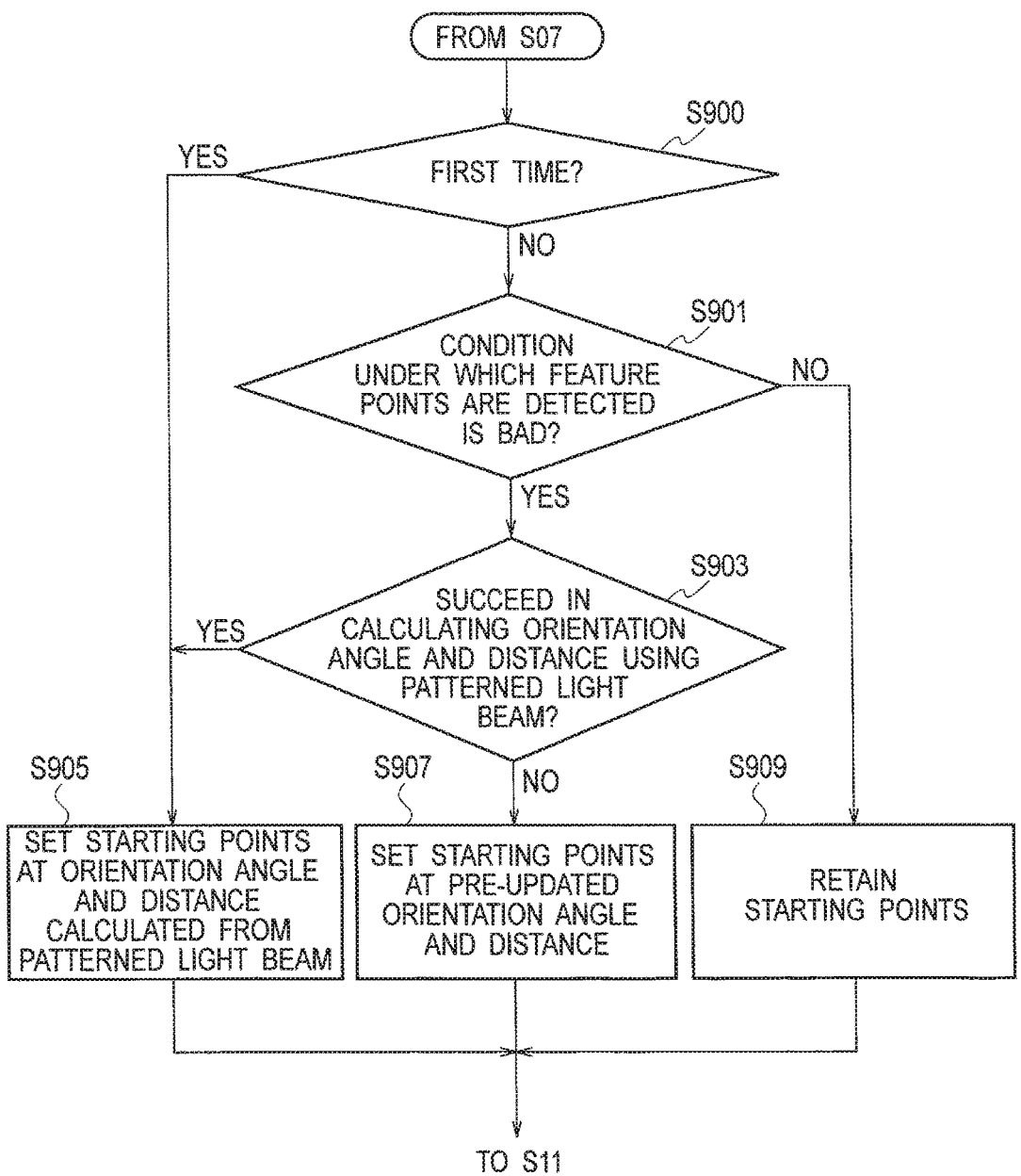
FIG. 9 is a flowchart showing a detailed procedure for step S09 in FIG. 8.

Referring to a flowchart shown in FIG. 9, descriptions will be provided for a detailed procedure for step S09 in FIG. 8. In step S900, the ECU 13 determines whether or not the current information process cycle is a first one. If the current information process cycle is a first one, that is to say, if no data on the previous information cycle is available, the procedure proceeds to a process in step S905. On the other hand, if the current information process cycle is not a first one, the procedure proceeds to a process in step S901. In step S901, the detection condition determining section 30 determines whether or not the condition under which the feature point detector 23 detects the feature points $T_e$ is too bad to satisfy the first criterion. If the detection condition determining section 30 determines that the condition is bad (if YES in step S901), the procedure proceeds to step S903. If the detection condition determining section 30 determines that the condition is not bad (if NO in step S901), the procedure proceeds to step S909.

In step S909, the ECU 13 retains the currently-set starting points of the integration operations as they are.

In step S903, the calculation state determining section 35 determines whether or not the state of the calculation of the distance and orientation angle by the orientation angle calculator 22 is too bad to satisfy the second criterion. For example, the calculation state determining section 35 determines whether or not the orientation angle calculator 22 succeeds in calculating the distance and orientation angle in step S509 in the same information process cycle. If the calculation state determining section 35 determines that the orientation angle calculator 22 succeeds (if YES in step S903), the procedure proceeds to step S905. If the calculation state determining section 35 determines that the orientation angle calculator 22 fails (if NO in step S903), the procedure proceeds to step S907.

In step S905, the ECU 13 sets the starting point of the integration operation on the amount of movement of the vehicle at the current position of the vehicle, and sets the starting points of the integration operations at the distance and orientation angle calculated in step S05 in the same information process cycle. Using the distance and orientation angle as the starting points, the integration operations are started afresh. In addition, using the current position of the vehicle as the starting point, the integration operation on the amount of movement of the vehicle is started afresh.

In step S907, the ECU 13 sets the starting point of the integration operation on the amount of movement of the vehicle at the current position of the vehicle, and sets the starting points of the integration operations at the distance and orientation angle employed in the previous information process cycle. Using the distance and orientation angle as the starting points, the integration operations are started afresh. In addition, using the current position of the vehicle as the starting point, the integration operation on the amount of movement of the vehicle is started afresh. Thereafter, the process proceeds to step S11 in FIG. 8.

The following operation/working-effect can be obtained from the first embodiment as described above.

Figure 10:
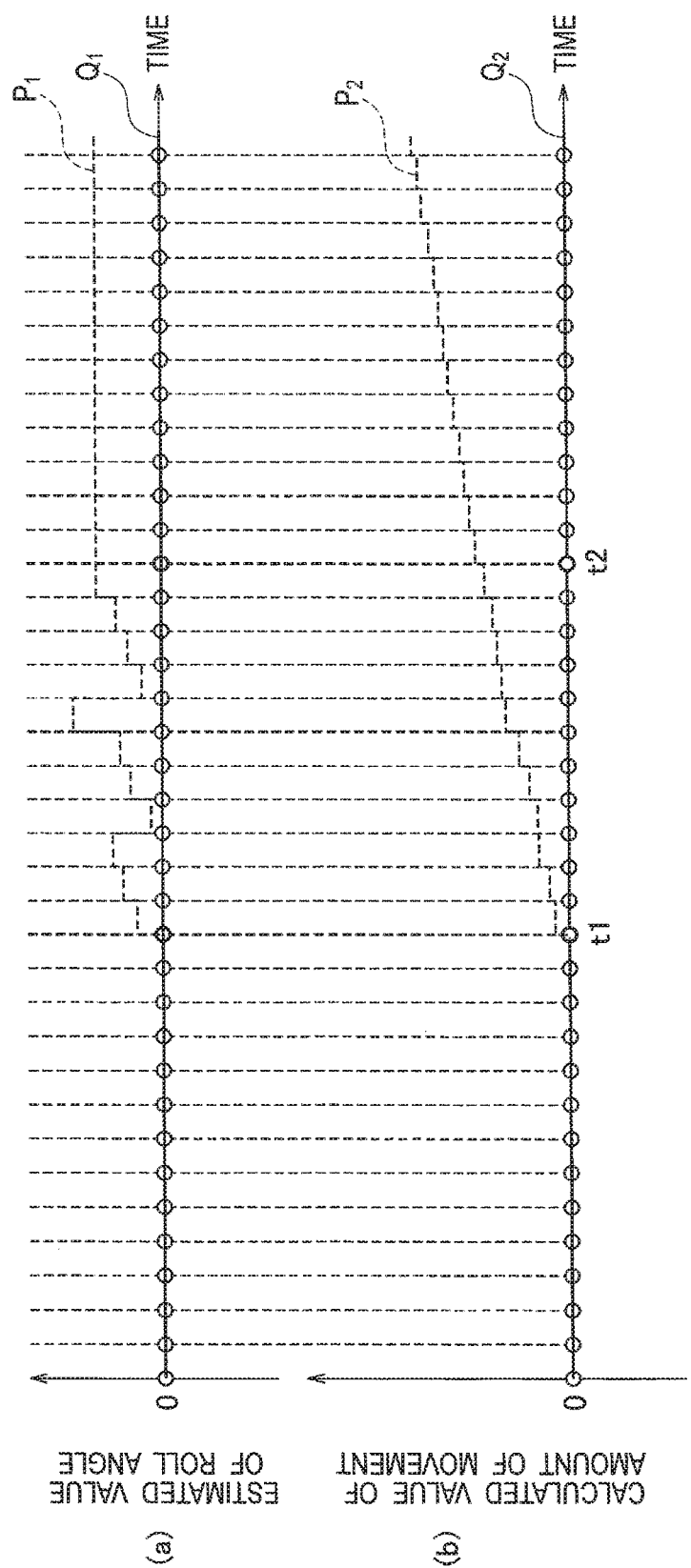
FIGS. 10(a) and 10(b) are graphs showing an error in estimating a roll angle of the vehicle 10, and an error in estimating an amount of movement of the vehicle 10 in a vehicle-width direction.

The detection of the feature points under a bad condition results in a decrease in the accuracy with which the orientation change amount calculator 24 calculates the distance and orientation angle, and accordingly leads to an increase in the error in estimating the amount of movement of the vehicle 10. FIGS. 10(a) and 10(b) are graphs respectively showing an example of an error in estimating a roll angle (an example of the orientation angle) of the vehicle 10, and an example of an error in estimating the amount of movement (in the vehicle-width direction) of the vehicle 10. FIG. 10(a) shows a temporal change in a value of the roll angle which is calculated in a case where the vehicle 10 is running straightly on a flat road surface without inclinations, while FIG. 10(b) shows a temporal change in a value of the amount of movement which is calculated in the same case. Reference signs "P1" and "P2" in FIGS. 10(a) and 10(b) respectively represent an estimated value of the roll angle and a calculated value of the amount of movement which are obtained in a comparative example where the starting point for calculating the amount of movement, and the starting points for performing the integration operation on the distance and orientation angle are kept unchanged regardless of the condition under which the feature points are detected. Reference signs "Q1" and "Q2" in FIGS. 10(a) and 10(b) respectively represent a true value of the roll angle and a true value of the amount of movement. Since the vehicle 10 is running straightly, the true value (Q1) of the roll angle and the true value (Q2) of the amount of movement in the vehicle-width direction remain unchanged at zero. However, in a time interval from time t1 to time t2, an error occurs in the plane equation of the road surface and this error causes an error in estimating the roll angle, because the vehicle 10 runs on a concrete pavement which makes the feature points detected under a bad condition. The error in the roll angle becomes reflected in the amount of movement in the vehicle-width direction. In the comparative example, regardless of the condition under which the feature points are detected, the starting points for performing the integration operation on the roll angle are not reset, or the starting point for calculating the amount of movement is not reset. This amplifies the error in the amount of movement of the vehicle 10.

According to the first embodiment, if the condition under which the feature points are detected is too bad to satisfy the first criterion, the integration operations can be started afresh using the starting points which are reset at the error-minimized distance and orientation angle calculated from the patterned light beam 32a. Accordingly, the current position of the vehicle 10 can be estimated accurately and stably.

Moreover, the road surface which makes the feature points detected under a bad condition includes, for example, a road surface which offers small numbers of patterns, dents and projections to be used as feature points. Since the road surface offering small numbers of patterns, dents and projections is very flat, less noise components are included in the distance and orientation angle calculated from the patterned light beam 32a. On the other hand, in the case of the road surface 31 from which the feature points can be detected under a good condition, positions on the road surface 31 off which the patterned light beam is reflected are not stable due to dents and projections of the asphalt pavement, and accordingly more noise components are included in the distance and orientation angle calculated from the patterned light beam 32a. According to the first embodiment, the distance and orientation angle can be obtained accurately and stably by selectively either updating the distance and orientation angle using the feature points or calculating the distance and orientation angle using the patterned light beam 32a depending on the conditions under which the feature points are detected.

Furthermore, in some cases, the condition under which the feature points are detected becomes bad because of a reduction in the contrast of the image 38 due to a sudden change in the illuminance of the road surface 31. According to the first embodiment, no sensor, such as an illuminometer, need be additionally provided to the self-position calculating apparatus since the condition under which the feature points are detected is directly determined. This contributes to a reduction in costs, and a reduction in the weight of the apparatus.

If the number of feature points associated by the orientation change amount calculator 24 between the previous and current frames is equal to or less than a predetermined threshold value, the detection condition determining section 30 determines that the condition under which the feature points are detected is too bad to satisfy the first condition (YES in step S901). If the number of feature points associated between the previous and current frames becomes smaller, the accuracy of updating the distance and orientation angle decreases. In that case, it is possible to inhibit a decrease in the accuracy of updating the distance and orientation angle, and a decrease in the accuracy of calculating the amount of movement of the vehicle 10, by resetting the starting points for calculating the amount of movement at the distance and orientation angle calculated from the patterned light beam 32a.

If the condition under which the feature points are detected is worse than the first criterion (YES in step S901), and if the state of the calculation of the distance and orientation angle is too bad to satisfy the second criterion (NO in step S903), the starting points for calculating the amount of movement are reset at the distance and orientation angle calculated in the previous information process cycle. In other words, the distance and orientation angle calculated by the self-position calculator 26 before the detection condition determining section 30 determines that the condition under which the multiple feature points are detected is too bad to satisfy the first criterion are used as the starting points for or calculating the amount of movement. Thereby, it is possible to inhibit the error in estimating the amount of movement of the vehicle 10.

(First Modification)

The determination by the detection condition determining section 30 on the condition under which the feature points $T_e$ are detected may be based on the distribution of the feature points, instead of the number of feature points. For example, the detection condition determining section 30 may be configured to determine that the condition under which the feature points are detected is too bad to satisfy the first criterion in a case where the density of the feature points detected from the image 38 is equal to or less than predetermined threshold density. When the density of the feature points becomes lower, a total number N of feature points decreases, and the number of feature points associated between the previous and current frames accordingly decreases. Otherwise, the detection condition determining section 30 may be configured to determine that the condition under which the feature points are detected is too bad to satisfy the first criterion in a case where no feature points are detected from respective regions into which the image 38 are equally divided. For example, the configuration may be made such that: the image 38 is equally divided into four regions; and the detection condition determining section 30 determines whether or not feature points are detected from the each region.

When the detection condition determining section 30 determines the condition under which the feature points are detected based on the density of the feature points detected from the image 38, it is possible to inhibit a decrease in the accuracy of updating the distance and orientation angle, and a decrease in the accuracy of calculating the amount of movement of the vehicle 10.

Furthermore, a decrease in the density of detected feature points makes distances between the feature points longer. This makes the plane defined by the feature points more likely to become different from the road surface 31, and makes it difficult to calculate the distance and orientation angle accurately. That is because, generally speaking, the road surface 31 is not flat due to a cant (slope) provided to the road surface in order to facilitate drainage. In addition, a lower density of detectable feature points means that, as described above, the road surface 31 is less uneven and patterned. This decreases the amount of noise components which are included in the distance and orientation angle calculated from the patterned light beam 32a. Nevertheless, the distance and orientation angle can be obtained accurately and stably by selectively either updating the distance and orientation angle using the feature points or calculating the distance and orientation angle using the patterned light beam 32a depending on the conditions under which the feature points are detected.

(Second Modification)

Moreover, the determination by the detection condition determining section 30 on the condition under which the feature points are detected may be based on an average of brightness of the image 38 obtained by the camera 12. For example, the detection condition determining section 30 may be configured to determine that the condition under which the feature points are detected is too bad to satisfy the first criterion if the average of the brightness of the image 38 is greater than an upper limit value $B_{max}$ or less than a lower limit value $B_{min}$. In other words, the detection condition determining section 30 determines that the condition under which the feature points are detected is bad if it is very bright or dark. For example, the upper limit value $B_{max}$ and the lower limit value $B_{min}$ may be set at 200 and 50, respectively.

(Third Modification)

In step S907 in FIG. 9, the ECU 13 may be configured to set the starting points of the integration operations at predetermined initial distance and orientation angle, instead of the distance and orientation angle employed in the previous information process cycle. To put it in detail, the self-position calculator 26 may be configured to set the starting points of the integration operations at the predetermined initial distance and orientation angle obtained with at least the occupants and payload of the vehicle 10 taken into consideration if the detection condition determining section 30 determines that the condition under which the feature points are detected is too bad to satisfy the first criterion, and concurrently if the calculation state determining section 35 determines that the state of the calculation of the distance and orientation angle by the orientation angle calculator 22 is too bad to satisfy the second criterion. For example, the distance and orientation angle calculated in step S05 in the information process cycle immediately after the self-position calculating apparatus is activated may be used as the starting points. Thereby, the distance and orientation angle can be updated and the amount of movement can be calculated by setting the starting points at the distance and orientation angle which is not affected by the roll or pitch of the vehicle 10 due to a turn, acceleration or deceleration of the vehicle 10.

Second Embodiment

Figure 11:
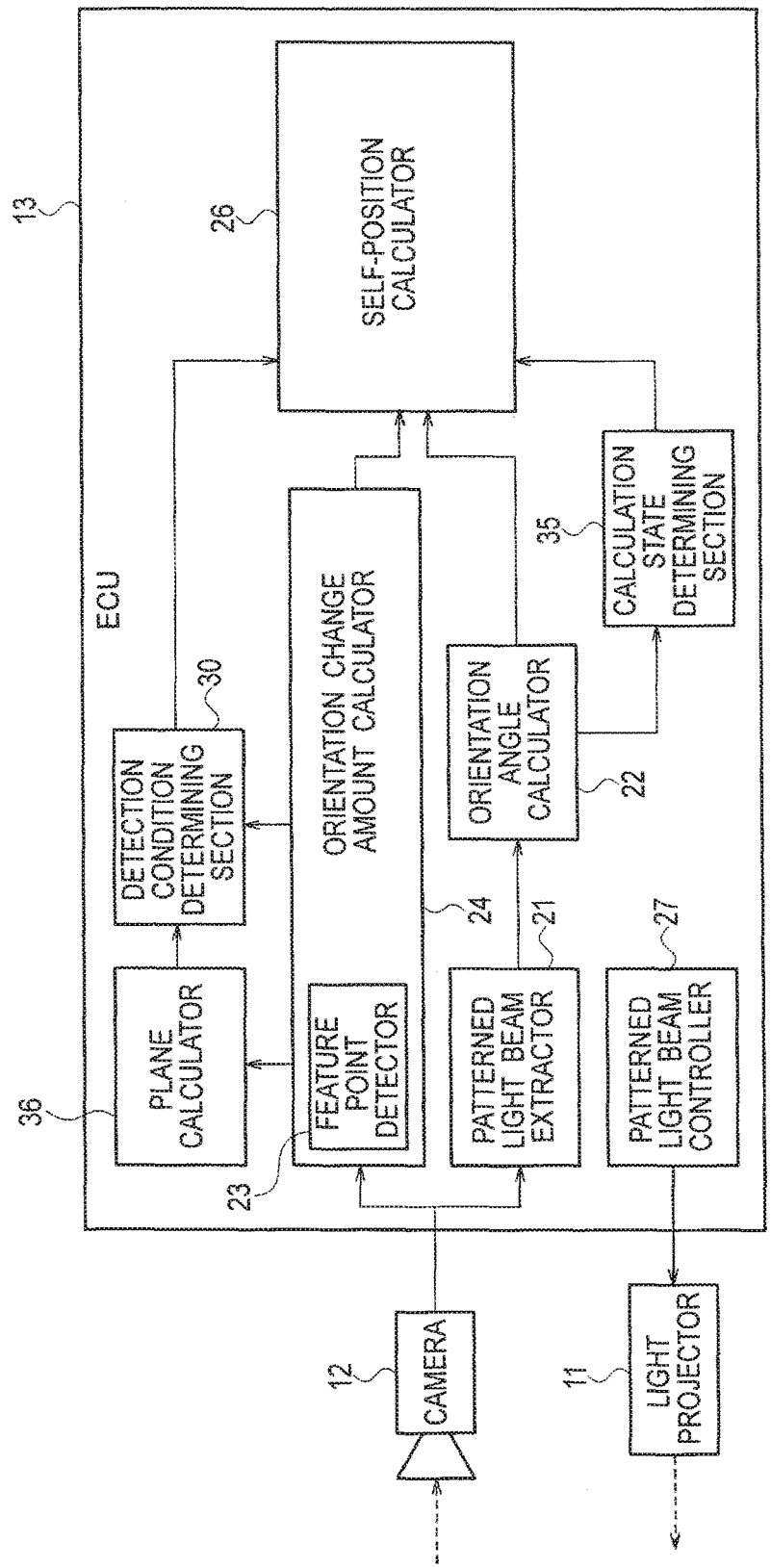
FIG. 11 is a block diagram showing an overall configuration of a self-position calculating apparatus of a second embodiment.

As shown in FIG. 11, a self-position calculating apparatus of a second embodiment is different from the self-position calculating apparatus shown in FIG. 1 in that the ECU 13 further includes a plane calculator 36. The plane calculator 36 calculates the plane G including the feature points $T_{e1}$, $T_{e2}$, $T_{e3}$ shown in FIG. 6 from the relative positions ($X_i$, $Y_i$, $Z_i$) of some feature points. If accuracy with which the plane calculator 36 calculates the plane G is equal to or less than predetermined threshold accuracy, the detection condition determining section 30 determines that the condition under which the feature points are detected is too bad to satisfy the first criterion. The other configuration is the same as that of the first embodiment. For this reason, descriptions for the other configuration will be omitted.

For example, in a case where the feature points whose relative positions ($X_i$, $Y_i$, $Z_i$) are calculated are on a straight line, the plane calculator 36 determines that the accuracy with which the plane G is calculated is equal to or less than the predetermined threshold accuracy. To put it specifically, using the Hough transform, the plane calculator 36 calculates a distribution of the gradients of the feature points and the distances of the feature points from the center of the plane G. If 90% of the detected feature points satisfies both a condition that their gradients fall within a range between minus and plus 5 degrees of a certain angle and a condition that their distances from the center of the plane G fall within a range between minus and plus 10 pixels, the plane calculator 36 determines that the feature points are on a straight line. Incidentally, the coordinates of the feature points to be used for the Hough transform are their positions ($U_i$, $V_i$) on the image.

Where road signs, inclusive of a pedestrian crossing and a pavement marking, are painted on the road surface 31, there is likelihood that feature points detected from there are distributed concentratedly in the form of a certain stripe or line. In that case, the detected feature points lie in a straight line with high certainty. This decreases the accuracy with which the plane G defined by the feature points is calculated. A decrease in the accuracy cannot be proved from the number of feature points, or from the density of the feature points. The second embodiment, however, can appropriately determine the condition under which the feature points are detected according to the accuracy with which the plane G defined by the feature points is calculated.

Third Embodiment

Figure 12:
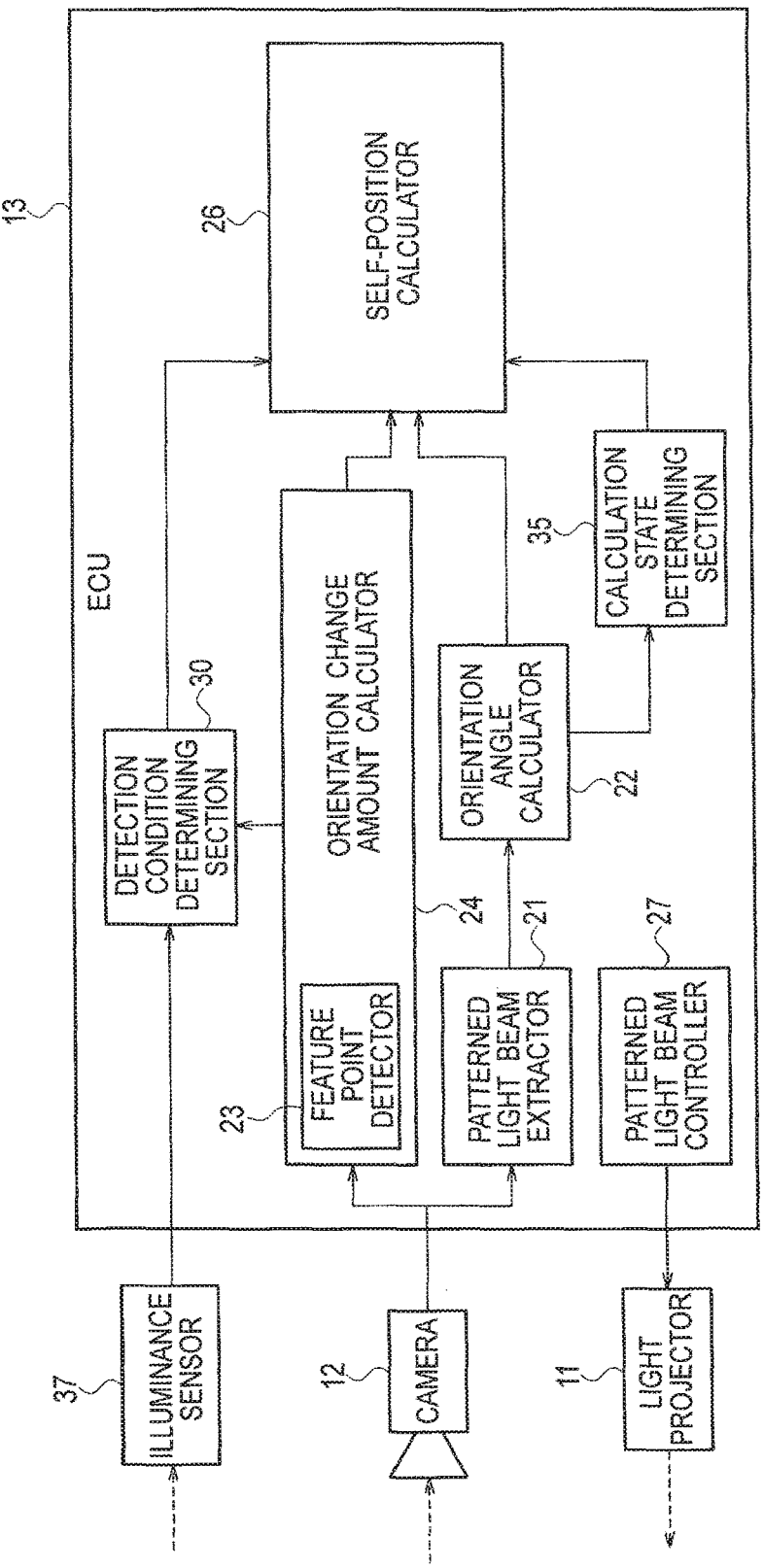
FIG. 12 is a block diagram showing an overall configuration of a self-position calculating apparatus of a third embodiment.

As shown in FIG. 12, a self-position calculating apparatus of a third embodiment is different from the self-position calculating apparatus shown in FIG. 1 in that the self-position calculating apparatus of the third embodiment further includes an illuminance sensor 37 as an example of an illuminance detector for detecting an amount of change in the illuminance around the vehicle. If the amount of change in the illuminance detected by the illuminance sensor 37 is equal to or greater than a predetermined threshold illuminance, the detection condition determining section 30 determines that the condition under which the feature points are detected is too bad to satisfy the first criterion. The other configuration is the same as that of the first embodiment. For this reason, descriptions for the other configuration will be omitted.

If the diaphragm of the camera 12 or an ISO-sensitivity automatic adjustment cannot follow a sharp change in the illuminance around the vehicle, blown-out highlights or blocked-up shadows occurs on the image obtained by the camera 12. This makes it difficult to detect the feature points from the image, and accordingly worsens the condition under which the feature points are detected. With this taken into consideration, like the camera 12 and the light projector 11, the illuminance sensor 37 is installed in the front of the vehicle, and a determination is made on the condition under which the feature points are detected according to the amount of change in the illuminance detected by the illuminance sensor 37. By detecting the likelihood in advance that no feature points become able to be detected by the camera 12, the distance and orientation angle are calculated from the patterned light beam 32a projected on the road surface 31. This makes it possible to appropriately determine the condition under which the feature points are detected.

Although the first to third embodiments have been described as above, neither of the descriptions and drawings constituting parts of the disclosure shall be construed as limiting the present invention. The disclosure will make various alternative embodiments, examples and operational techniques clear to those skilled in the art.

Incidentally, although FIG. 2 shows the example where the camera 12 and the light projector 11 are installed in the front of the vehicle 10, the camera 12 and the light projector 11 may be installed in the sides, rear or bottom of the vehicle 10. Furthermore, although FIG. 2 shows the four-wheeled passenger car as an example of the vehicle 10 of the embodiments, the present invention is applicable to all the moving bodies (vehicles), such as motorbikes, trucks and special vehicles for transporting construction machines, as long as feature points on road surfaces and wall surfaces can be captured from such moving bodies.

REFERENCE SIGNS LIST 10 vehicle
11 light projector
12 camera (image capturing unit)
21 patterned light beam extractor
22 orientation angle calculator
23 feature point detector
24 orientation change amount calculator
26 self-position calculator
30 road surface condition determining section
31 road surface
32a, 32b patterned light beam
35 calculation state determining section
36 plane calculator
37 illuminance sensor (illuminance detector)
Te feature point

The invention claimed is:

1. A self-position calculating apparatus comprising:
a light projector configured to project a patterned light beam onto a road surface around a vehicle;
a camera installed in the vehicle, and configured to capture an image of the road surface around the vehicle including an area onto which the patterned light beam is projected;
a processor; and
a memory that stores executable instructions, which, when executed by the processor, become operational with the processor to:
calculate an orientation angle of the vehicle relative to the road surface from a position of the patterned light beam on the image obtained by the camera;
calculate an amount of change in orientation of the vehicle based on temporal changes in a plurality of feature points on the road surface which are detected from the image obtained by the camera;
calculate current position and orientation angle of the vehicle by adding the amount of change in the orientation to initial position and orientation angle of the vehicle; and
determine under what condition the plurality of feature points are detected, wherein
if the condition under which the plurality of feature points are detected does not satisfy a first criterion, set the current position of the vehicle at that time and the orientation angle of the vehicle is calculated at the initial position and orientation angle of the vehicle and the amount of change in the orientation is added to the initial position and orientation angle.

2. The self-position calculating apparatus according to claim 1, wherein the instructions stored in the memory further comprise instructions to:
if the number of the plurality of feature points used by the orientation change amount calculator is equal to or less than a predetermined threshold value, determine that the condition under which the plurality of feature points are detected does not satisfy the first criterion.

3. The self-position calculating apparatus according to claim 1, wherein the instructions stored in the memory further comprise instructions to:
if density of the feature points detected from the image is equal to or less than predetermined threshold density, determine that the condition under which the plurality of feature points are detected does not satisfy the first criterion.

4. The self-position calculating apparatus according to claim 1, wherein the instructions stored in the memory further comprise instructions to:
calculate a plane including the plurality of feature points from relative positions of the plurality of feature points detected from the image, wherein
if accuracy with which the plane is calculated is equal to or less than predetermined threshold accuracy, determine that the condition under which the plurality of feature points are detected does not satisfy the first criterion.

5. The self-position calculating apparatus according to claim 1, wherein the instructions stored in the memory further comprise instructions to:
detect an amount of change in an illuminance around the vehicle, wherein
if the amount of change in the illuminance around the vehicle is equal to or greater than a predetermined threshold illuminance, determine that the condition under which the plurality of feature points are detected does not satisfy the first criterion.

6. The self-position calculating apparatus according to claim 1, wherein the instructions stored in the memory further comprise instructions to:
determine a state of calculation of the orientation angle by the orientation angle calculator, wherein
if the condition under which the plurality of feature points are detected does not satisfy the first criterion, and if the state of the calculation of the orientation angle does not satisfy a second criterion, start to add the amount of change in the orientation to the initial orientation angle which is set with at least occupants and payload of the vehicle taken into consideration.

7. The self-position calculating apparatus according to claim 1, wherein the instructions stored in the memory further comprise instructions to:
determine a state of calculation of the orientation angle, wherein
if the condition under which the plurality of feature points are detected does not satisfy the first criterion, and if the state of the calculation of the orientation angle does not satisfy a second criterion, start to add the amount of change in the orientation to an orientation angle which is calculated before determining that the condition under which the plurality of feature points are detected does not satisfy the first criterion.

8. A self-position calculating method comprising:
a step of projecting a patterned light beam onto a road surface around a vehicle, by a light projector installed in the vehicle;
a step of capturing an image of the road surface around the vehicle including an area onto which the patterned light beam is projected, by a camera installed in the vehicle;
a step of calculating an orientation angle of the vehicle relative to the road surface from a position of the patterned light beam on the image, by a controller of the vehicle;
an orientation angle change amount calculating step of calculating an amount of change in the orientation of the vehicle based on temporal changes in a plurality of feature points on the road surface which are detected from the image, by the controller;
a self-position calculating step of calculating current position and orientation angle of the vehicle by adding the amount of change in the orientation to initial position and orientation angle of the vehicle, by the controller; and
a step of determining under what condition the plurality of feature points are detected in the orientation change amount calculating step, by the controller, wherein
if the condition under which the plurality of feature points are detected does not satisfy a first criterion, the self-position calculating step sets the current position of the vehicle at that time and the orientation angle of the vehicle calculated from the position of the patterned light beam at the initial position and orientation angle of the vehicle, and starts to add the amount of change in the orientation to the initial position and orientation angle.

9. A self-position calculating apparatus comprising:
a light projector configured to project a patterned light beam onto a road surface around a vehicle;
a camera installed in the vehicle and configured to capture an image of the road surface around the vehicle including an area onto which the patterned light beam is projected;
a processor; and
a memory that stores executable instructions, which, when executed by the processor, become operational with the processor to:
calculate an initial orientation angle of the vehicle relative to the road surface from a position of the patterned light beam on the image obtained by the camera;
calculate an amount of change in orientation of the vehicle based on temporal changes in feature points on the road surface that are detected from the image obtained by the camera;
update a current position and a current orientation angle of the vehicle by adding the amount of change in the orientation to an initial position and the initial orientation angle of the vehicle; and
based on a determination that a condition under which the feature points are detected does not satisfy a first criterion, set the current position and the current orientation angle of the vehicle as the initial position and the initial orientation angle of the vehicle.

* * * * *